United States Patent
Ruchet

(10) Patent No.: US 9,900,087 B2
(45) Date of Patent: Feb. 20, 2018

(54) MULTIMODE LAUNCH SYSTEMS FOR USE IN PERFORMING AN OTDR MEASUREMENT ON A MULTI-FIBER ARRAY DUT AND METHOD OF PERFORMING SAME

(71) Applicant: EXFO INC., Quebec (CA)

(72) Inventor: Bernard Ruchet, Quebec (CA)

(73) Assignee: EXFO INC., Quebec (CA)

( * ) Notice: Subject to any disclaimer, the term of this patent is extended or adjusted under 35 U.S.C. 154(b) by 0 days.

(21) Appl. No.: 15/263,036

(22) Filed: Sep. 12, 2016

(65) Prior Publication Data

US 2017/0085317 A1    Mar. 23, 2017

Related U.S. Application Data

(60) Provisional application No. 62/221,177, filed on Sep. 21, 2015, provisional application No. 62/301,799, filed on Mar. 1, 2016.

(51) Int. Cl.
*H04B 10/071* (2013.01)
*H04B 10/2581* (2013.01)
(Continued)

(52) U.S. Cl.
CPC ........ *H04B 10/071* (2013.01); *G01M 11/3136* (2013.01); *G01M 11/3154* (2013.01); *G02B 6/14* (2013.01); *H04B 10/2581* (2013.01)

(58) Field of Classification Search
CPC .... H04B 10/00; H04B 10/032; H04B 10/071; H04B 10/0771; H04B 10/0775; H04B 10/2581
See application file for complete search history.

(56) References Cited

U.S. PATENT DOCUMENTS 4,998,792 A * 3/1991 Boerstler ................. G02B 6/14
385/29
5,104,219 A * 4/1992 Bell .................... G01M 11/3145
356/73.1
(Continued)

FOREIGN PATENT DOCUMENTS

GB          2405488 B      8/2005

OTHER PUBLICATIONS

Photon Kinetics: "OFC Update", Mar. 1, 2014, XP055339923, Retrieved from the Internet: URL:http://www.pkinetics.com/Downloads/items/OFC%202014%20Update.pdf [retrieved on Jan. 27, 2017].
(Continued)

*Primary Examiner* — Ted Wang
(74) *Attorney, Agent, or Firm* — Norton Rose Fulbright Canada LLP; Alexandre Daoust

(57) ABSTRACT

A multimode launch system to be connected to an Optical Time-Domain Reflectometer (OTDR) for use in performing at least one OTDR measurement on a multi-fiber array Device Under Test (DUT), the multimode launch system comprising: an optical switch being connectable to the OTDR during use; a launch array device having an end being connectable to the optical switch and another end being connectable to the multi-fiber array DUT during use, the launch array device having a plurality of multimode launch optical fibers each having at least one first guidance parameter being smaller than a corresponding one of at least one second guidance parameter of at least one multimode optical fiber of the optical switch; and a multi-fiber mode conditioner along the launch array device for inducing a preferential attenuation of higher-order optical modes of test light propagated into the multi-fiber array DUT during use.

19 Claims, 6 Drawing Sheets

(51) Int. Cl.
*G01M 11/00* (2006.01)
*G02B 6/14* (2006.01)

(56) References Cited

U.S. PATENT DOCUMENTS

| | | | |
|---|---|---|---|
| 9,310,275 B1 † | 4/2016 | Irving | |
| 2011/0235970 A1 * | 9/2011 | Flora | G01M 11/3154 385/28 |
| 2016/0218802 A1 † | 7/2016 | Ruchet | |

OTHER PUBLICATIONS

Telecommunications Industry Association, "Optical Power Loss Measurements of Installed Multimode Fiber Cable Plant; IEC 61280-4-1 Edition 2, Fibre-Optic Communications Subsystem Test Procedure—Part 4-1 : Installed cable plant-Multimode attenuation measurement", TIA-526-14-B, Oct. 2010, Virginia, all pages.

\* cited by examiner
† cited by third party

MULTIMODE LAUNCH SYSTEMS FOR USE IN PERFORMING AN OTDR MEASUREMENT ON A MULTI-FIBER ARRAY DUT AND METHOD OF PERFORMING SAME

REFERENCE TO RELATED APPLICATIONS

This patent application claims priority of U.S. provisional Application Ser. No. 62/221,177, filed on Sep. 21, 2015, and of U.S. provisional Application Ser. No. 62/307,799, filed on Mar. 1, 2016, the contents of which are hereby incorporated by reference.

FIELD

The improvements generally relate to characterization of multimode optical fiber devices, and more specifically to characterization of multimode multi-fiber array devices under test using optical time-domain reflectometry.

BACKGROUND

When performing an Optical Time-Domain Reflectometer (OTDR) measurement on a Device Under Test (DUT), the modal distribution of the test light must be carefully controlled in order to measure reproducible values of insertion loss or attenuation. If the modal distribution of the test light is not well controlled, "differential mode attenuation" may lead to unrepeatable and irreproducible measurement results.

In order to address this issue, test and measurement international Standards such as the Telecommunication Industry Association (TIA-526-14-B) and the International Electrotechnical Commission (IEC 61280-4-1) define requirements on the modal distribution of test light for performing measurements on multimode DUTs. For example, the IEC 61280-4-1 Standard provides for a target for an Encircled Flux function, EF(r) characterizing the modal distribution of test light exiting the launch cord (into air) which is to be launched into the multimode DUT. The encircled flux function EF(r) defines very tight tolerances on deviations from that target. It is defined as that proportion of the total exiting optical power which falls within a circle (i.e. "encircled") of radius r at the end face of the fiber, where r is the radial distance from the optical center of the fiber core, at four or five predefined radial values in the fiber core and for each of two wavelengths, i.e. 850 and 1300 nm. Other methods of characterizing the modal distribution of light also exist.

When light is coupled into a multimode launch cord, depending on the coupling conditions and on the optical power density of the optical source, the coupling may result in light exiting the multimode launch cord being "underfilled" (i.e. too few modes are excited) or "overfilled" (i.e. too many modes are excited). The modal distribution of the test light launched into the multimode DUT need to be adjusted to comply with the EF requirements or any other suitable modal distribution requirement that may be defined by Standards. Various means for controlling the modal distribution of the test light exist in the art including that based on mandrel wrapping, i.e. the tight winding of a multimode optical fiber about a circular mandrel of a given diameter. Mandrel wrapping results in a preferential attenuation of the high-order modes corresponding to an initially overfilled condition. Launch conditions in compliance with a given set of modal distribution requirements (e.g. as defined in the IEC 61280-4-1 Standard) are said to be "mode conditioned".

In some instances, the multimode DUT may be provided in the form of a multimode multi-fiber array DUT, e.g., a multi-fiber ribbon link or a multi-fiber device terminated by multi-fiber array connectors. When performing the OTDR measurement on the multi-fiber array DUT, the OTDR measurement is manually and sequentially repeated for each fiber of the multi-fiber array DUT. In order to access each fiber path of the multi-fiber array DUT, a fan out adapter may be connected between the launch cord and the multi-fiber array connector.

Although existing measurement systems were satisfactory to a certain extent, there remains room for improvement, particularly in providing an automated method of performing an OTDR measurement on the multi-fiber array DUT while maintaining launch conditions that are in compliance with relevant modal distribution requirements. Moreover, there also remains room for improvement in increasing the life span of test components used in performing an OTDR measurement on a multimode multi-fiber array DUT.

SUMMARY

A conventional optical switch between the launch cord and the multi-fiber array DUT may be used to automate the OTDR measurements on all fiber paths of the multi-fiber array DUT.

This disclosure relates to systems and methods for alleviating a drawback associated with the use of a conventional optical switch in performing an OTDR measurement on a multimode multi-fiber array DUT using launch conditions that are in compliance with relevant modal distribution requirements.

An example of a measurement system using a conventional optical switch 10 is schematized in FIG. 1. As it can be seen, test light is propagated, from an OTDR 20, into the launch device 30, the conventional optical switch 10, a multimode multi-fiber array DUT 50 (referred to as "multi-fiber array DUT 50") and a receive multi-fiber array device (referred to as "receive array device 60") serially connected to one another. The launch device 30 includes a launch fiber 32 and a mode conditioner 40 therealong to filter the light modal distribution. The light which exits from the launch device 30 is mode conditioned in compliance with a given set of modal distribution requirements (e.g., the EF requirements as defined in the IEC 61280-4-1 Standard) before it is launched into the multimode multi-fiber array DUT 50. During use, the conventional optical switch 10 has an input multimode optical fiber being connectable to the launch device 30 and a plurality of output multimode optical fibers connectable to the multi-fiber array DUT 50. The conventional optical switch 10 is configured to receive test light from the OTDR 20 into the input multimode optical fiber and for selectively transmitting the received test light into one of the plurality of output multimode optical fibers so that the OTDR measurements on the multi-fiber array DUT 50 can be measured in an automated manner.

However, conventional optical switches may be imperfect. For instance, the conventional optical switches can filter higher-order optical modes of the test light and scramble (i.e. distribute) the optical modes of the test light. Therefore, when using the measurement system shown in FIG. 1, the test light actually launched into the multi-fiber array DUT 50 may have a modal distribution which is not mode conditioned.

Turning now to the measurement system of FIG. 2, it was found that mode conditioned test light may be launched into all fiber paths of the multi-fiber array DUT 50 by propagating, from the OTDR 20, the test light into the conventional optical switch 10, into a launch multi-fiber array device 70 (simply referred to as "launch array device 70") including a multi-fiber mode conditioner 80 therealong to filter the light modal distribution, into the multi-fiber array DUT 50. Any scrambling of the test light that can be caused by the conventional optical switch 10 is thereby corrected by the multi-fiber mode conditioner 80 of the launch array device 70.

However, although satisfactory to a certain extent, (backward) mode filtering introduced by the conventional optical switch on the backwardly propagating light can introduce a first bias in the OTDR measurements. For ease of understanding, the following paragraphs describe in what situation such a first bias is introduced in the OTDR measurements and also describe how the first bias can be avoided.

As it will be understood, still referring to FIG. 2, obtaining an optical power attenuation value using the OTDR measurements on the multi-fiber array DUT 50 can be based on a difference between a first backscattering power level value associated with the launch array device 70 and a second backscattering power level value associated with the receive array device 60.

Test light backscattered by launch multimode optical fibers 71 of the launch array device 70 (referred to as "first backscattered test light portion"), as represented by arrow A in FIG. 2, is propagated respectively into the multi-fiber mode conditioner 80 thereof, into the conventional optical switch 10, into an internal coupler of the OTDR 20 prior to reaching an optical power detector of the OTDR 20 where the first backscattering power level value is measured.

Accordingly, the first backscattered test light portion, prior to propagation into the conventional optical switch 10, has been filtered only by the multi-fiber mode conditioner 80 of the launch array device 70 such that its modal distribution is expected to be mode conditioned in compliance with a given set of modal distribution requirements (e.g., the EF requirements as defined in the IEC 61280-4-1 Standard).

Correspondingly, test light backscattered by receive array device 60 (referred to as "second backscattered test light portion"), as represented by arrow B in FIG. 2, is propagated respectively into the multi-fiber array DUT 50, into the launch array device 70 (and its multi-fiber mode conditioner 80), into the conventional optical switch 10, into the internal coupler of the OTDR 20 prior to reaching the optical power detector of the OTDR 20 where the second backscattering power level value is measured.

Accordingly, the second test light portion, prior to propagation into the conventional optical switch 10, has been filtered by the multi-fiber array DUT 50 and by the multi-fiber mode conditioner 80 of the launch array device 70 such that its modal distribution is not necessarily mode conditioned.

For instance, if the multi-fiber array DUT 50 substantially filters the second backscattered test light portion, the modal distributions of the first and second test light portions, prior to propagation into the conventional optical switch 10, can differ from one another and therefore be filtered in a different manner by the conventional optical switch 10. More specifically, a modal distribution of the second backscattered test light portion, prior to propagation into the conventional optical switch 10, can be considered to be underfilled. In this specific case, the first and second backscattering power level values include different filtering by the conventional optical switch 10 which can introduce the first bias in the OTDR measurements.

It was found that the first bias can be overcome by selecting an optical switch that can provide an enhanced guidance to optical modes relatively to the guidance that can be provided by the multi-fiber array DUT 50 to the same optical modes (i.e. for a given beam diameter). To provide such an enhanced guidance, the selected optical switch can be characterized by at least one guidance parameter which is greater than a corresponding one of at least one guidance parameter of the multi-fiber array DUT 50. The at least one guidance parameter can include a fiber core diameter, a numerical aperture, or both. Other example of a guidance parameter may apply.

An example of such an optical switch is shown at 90 in FIG. 3. If the multi-fiber array DUT 50 is characterized by multimode fibers having at least one first guidance parameter, the optical switch 90 may be characterized by multimode fibers having at least one second guidance parameter greater than the at least one first guidance parameter.

In some embodiments, the first guidance parameter is a first fiber core diameter D1 and the second guidance parameter is a second fiber core diameter D2 greater than the first fiber core diameter D1 (D2>D1). For instance, the first fiber core diameter can be 50 μm and the second fiber core diameter can be 62.5 μm.

In some other embodiments, the first guidance parameter is a first numerical aperture NA1 and the second guidance parameter is a second numerical aperture NA2 greater than the first numerical aperture NA1 (NA2>NA1). For instance, the first numerical aperture can be 0.20 and the second numerical aperture can be 0.27.

In alternate embodiments, the at least one first guidance parameter includes two first guidance parameters such as a first fiber core diameter D1 and a first numerical aperture NA1 and the at least one second guidance parameter includes two second guidance parameters such as a second fiber core diameter D2 and a second numerical aperture NA2, wherein both the second fiber core diameter D2 and the second numerical aperture NA2 are greater than a respective one of the first core diameter D1 and the first numerical aperture NA1.

An optical switch 90 configured for OM1 multimode optical fibers has been found to be satisfactory (where OM1 multimode optical fibers are designed with a fiber core diameter of 62.5 μm and a numerical aperture of 0.27) when the multi-fiber array DUT 50 includes OM2, OM3 and/or OM4 multimode optical fibers (where OM2, OM3 and OM4 multimode optical fibers are designed with a fiber core diameter of 50 μm and a numerical aperture of 0.20).

Use of an optical switch having at least one larger guidance parameter (referred to as "larger-parameter optical switch 90" for simplicity) may cause scrambling of the optical modes of light propagated thereinto thus generating higher-order optical modes. However, it was found that the internal coupler 22 (see FIG. 3) of the OTDR 20 is sensitive to the higher-order OM1 optical modes generated by the larger-parameter optical switch 90 therefore a second bias can be introduced by using the larger-parameter optical switch 90.

To alleviate the second bias, a mode filter 100 configured to filter light can be provided between the internal coupler 22 of the OTDR 20 and the larger-parameter optical switch 90 to filter out the higher-order OM1 modes (high-order modes guided by a 62.5-μm core and by a 0.27 numerical aperture) generated by the larger-parameter optical switch 90 prior to detection, such as shown in FIG. 4. A mode filter 100 including an OM1 multimode optical fiber being wrapped around a mandrel of a given diameter or including a length of OM3 multimode optical fiber have been found to be satisfactory when the multi-fiber array DUT 50 includes OM2, OM3 and/or OM4 multimode optical fibers.

Another need exists in increasing the life of the test components (e.g., the launch array device, the conventional or larger-parameter optical switch, and/or the receive array device) for performing OTDR measurements on a multimode multi-fiber array DUT. As the connectors wear out, the worn connectors tend to cause Optical Return Loss (ORL) which is detrimental to OTDR measurements. By providing angle-polished connectors (hereinafter "APC connectors"), the APC connectors can have a longer life before being replaced because worn out APC connectors have low ORL and thus are less detrimental to OTDR measurements. APC connectors and/or multi-fiber APC array connector can thus be provided for instance at a connector interface of the OTDR, at either or both ends of the conventional and/or larger-parameter optical switch, and/or at either or both ends of the launch array device.

In accordance with one aspect, there is provided a multimode launch system to be connected to OTDR for use in performing at least one OTDR measurement on a multi-fiber array DUT, the multimode launch system comprising: an optical switch having an input multimode optical fiber and a plurality of output multimode optical fibers, the optical switch being configured to receive test light from the OTDR into the input multimode optical fiber and to selectively transmit the received test light into one of the plurality of output multimode optical fibers during use; a launch array device having an end being connectable to the plurality of output multimode optical fibers of the optical switch and another end being connectable to the multi-fiber array DUT during use, the launch array device having a plurality of multimode launch optical fibers each having at least one first guidance parameter being smaller than a corresponding one of at least one second guidance parameter of at least one of the input multimode optical fiber and the plurality of output multimode optical fibers of the optical switch; and a multi-fiber mode conditioner along the launch array device for inducing a preferential attenuation of higher-order optical modes of test light propagated into the multi-fiber array DUT during use.

In accordance with another aspect, there is provided an OTDR enclosing a multimode launch system, wherein the multi-fiber array DUT is connectable to the optical switch via a multi-fiber array connector of the OTDR.

In accordance with another aspect, there is provided a method for performing a measurement using an OTDR on a multi-fiber array DUT, the method comprising: using an optical switch, propagating test light received from the OTDR and transmitting the received test light along one of a plurality of multimode launch optical fibers of a launch array device each being connected to a respective one of a plurality of multimode optical fibers of the multi-fiber array DUT; using a multi-fiber mode conditioner of the launch array device, inducing a preferential attenuation of high-order optical fiber modes of the test light being propagated along the launch array device and on a portion of the test light being backscattered along the launch array device; and using the optical switch, scrambling the optical fiber modes of the backscattered portion of test light prior to detection by the OTDR.

In accordance with another aspect, there is provided a multimode launch system to be connected to an OTDR for use in performing at least one OTDR measurement on a multi-fiber array DUT, the multimode launch system comprising: an optical switch being connectable to the OTDR during use; a launch array device having an end being connectable to the optical switch and another end being connectable to the multi-fiber array DUT during use, the launch array device having a plurality of multimode launch optical fibers each having at least one first guidance parameter being smaller than a corresponding one of at least one second guidance parameter of at least one multimode optical fiber of the optical switch; and a multi-fiber mode conditioner along the launch array device for inducing a preferential attenuation of higher-order optical modes of test light propagated into the multi-fiber array DUT during use.

In accordance with another aspect, there is provided a multimode launch system to be connected to an OTDR for use in performing at least one OTDR measurement on a multi-fiber array DUT, the multimode launch system comprising: a launch array device having an end being connectable to the OTDR and another end being connectable to the multi-fiber array DUT during use, the launch array device having at least one end being terminated by a multimode multi-fiber angle-polished array connector; and a multi-fiber mode conditioner along the launch array device for inducing a preferential attenuation of higher-order optical modes of test light propagated into the multi-fiber array DUT during use.

In some embodiments, the multimode launch system further comprises an optical switch connectable between the OTDR and the multimode launch system.

In some embodiments, the optical switch has one end terminated by an angle-polished connector and connectable to the OTDR.

In some embodiments, the multimode launch system further comprises a mode filter connectable between the OTDR and the optical switch.

In some embodiments, the mode filter is terminated by two angle-polished connectors, one of the angle-polished connectors of the mode filter being connectable to the OTDR and the other one of the angle-polished connectors of the mode filter being connectable to the optical switch.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
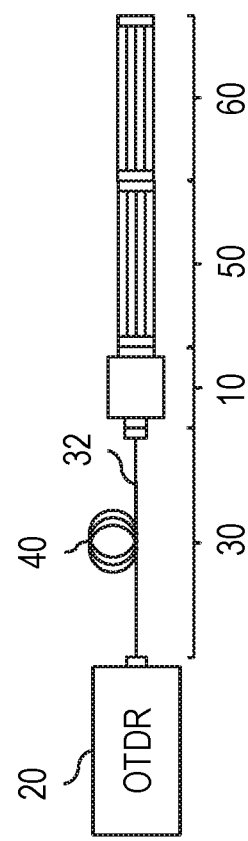
FIG. 1 is a schematic view of an example of a system for performing an OTDR measurement on a multi-fiber array DUT.
Figure 2:
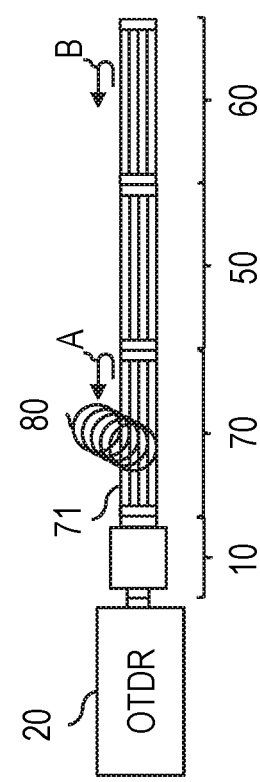
FIG. 2 is a schematic view of another example of a system for performing an OTDR measurement on a multi-fiber array DUT using a conventional optical switch.
Figure 3:
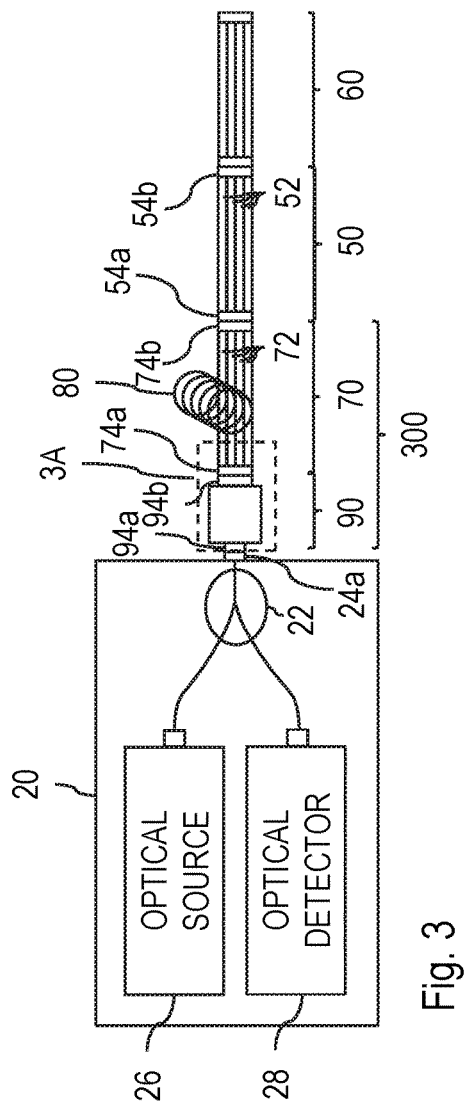
FIG. 3 is a schematic view of another example of a system for performing an OTDR measurement on a multi-fiber array DUT using a larger-parameter optical switch, in accordance with an embodiment.

FIG. 3 shows an example of a multimode launch system 300 for performing one or more OTDR measurements on a multi-fiber array DUT 50. The multimode launch system 300 is shown during use as it is connected between the OTDR 20 and the multi-fiber array DUT 50 followed by a receive array device 60.

As depicted, the multi-fiber array DUT 50 has a plurality of multimode optical fibers 52 terminated by first and second multi-fiber array connectors 54a and 54b. In this example, each multimode optical fiber 52 of the multi-fiber array DUT 50 is characterized by two first guidance parameters including a first fiber core diameter D1 and a first numerical aperture NA1. In this example, the nominal value of the first guidance parameter D1 is 50 µm and the nominal value of the first numerical aperture NA1 is 0.20 when the multimode optical fibers 52 are OM2, OM3 and/or OM4 multimode optical fibers. A typical multi-fiber array DUT 50 has twelve (12) or twenty-four (24) multimode optical fibers 52. An example of a multi-fiber array connector is the commercially available Multiple-fiber Push-On/Pull-Off (MPO) connector.

The multimode launch system 300 includes the larger-parameter optical switch 90, the launch array device 70 including a plurality of launch multimode optical fibers and the multi-fiber mode conditioner 80 provided therealong. As mentioned above, use of the larger-parameter optical switch 90 helps avoid introduction of a first bias in the OTDR measurements that would be introduced simply using a conventional optical switch.

Figure 3A:
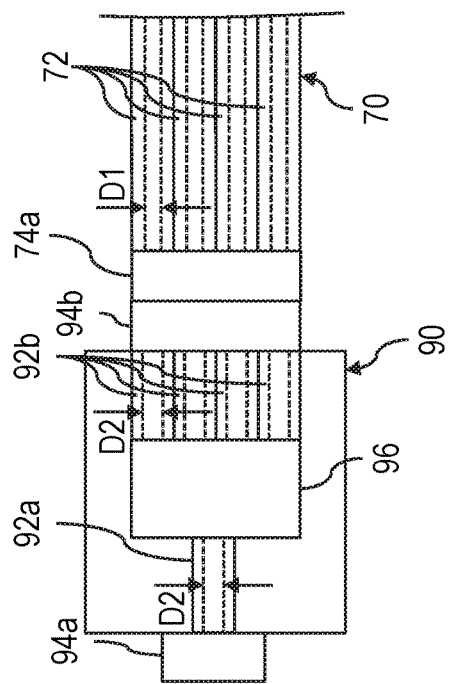
FIG. 3A is an enlarged view of the larger-parameter optical switch of FIG. 3, in accordance with an embodiment.

As best seen in FIG. 3A, the larger-parameter optical switch 90 has an input multimode optical fiber 92a and a plurality of output multimode optical fibers 92b. The input multimode optical fiber 92a has one end terminated by a first multimode connector 94a connectable to the OTDR 20, and the output multimode optical fibers 92b have a common end collectively terminated by a third multi-fiber array connector 94b connectable to the launch array device 70 during use.

The larger-parameter optical switch 90 is configured to receive test light into the input multimode optical fiber 92a and to selectively transmit the received test light into one of the plurality of output multimode optical fibers 92b during use. The selective transmission function can be performed by an optical switching mechanism 96 provided between the other ends of the input multimode optical fiber 92a and the output multimode optical fibers 92b. The optical switching mechanism 96 can involve Microelectromechanical Systems (MEMS), liquid crystals, mechanico-optic methods (e.g., prism(s) and grating(s)), acousto-optic methods, thermal methods, nonlinear methods, amplifiers and attenuators methods, piezoelectric beam steering methods, inkjet methods and/or any other suitable optical switching methods.

Referring back to FIG. 3, the launch array device 70 has a plurality of multimode launch optical fibers 72 terminated by fourth and fifth multi-fiber array connectors 74a and 74b. The fourth multi-fiber array connector 74a and a portion of the multimode launch optical fibers 72 of the launch array device 70 are shown in the enlarged view of FIG. 3A.

The multi-fiber mode conditioner 80 can be based on mandrel wrapping, i.e. the tight winding of each of at least a portion of the multimode launch optical fibers 72 of the launch array device 70 about a mandrel (e.g., a circular mandrel of a given diameter). The multi-fiber mode conditioner 80 results in a preferential attenuation of the high-order modes when the input light initially has overfilled launch conditions (relative to the IEC 61280-4-1 Standard).

In this example, the multimode launch optical fibers 72 of the launch array device 70 are characterized by two first guidance parameters, i.e. a fiber core diameter and a numerical aperture, which may correspond to that of the multimode optical fibers 52 of the multi-fiber array DUT 50. Therefore, for ease of reading, the fiber core diameter of the multimode launch optical fibers 72 of the launch array device 70 is directly referred to as the first fiber core diameter D1 and the numerical aperture of the multimode launch optical fibers 72 of the launch array device 70 is referred to as the first numerical aperture NA1. For example, the multimode launch optical fibers 72 of the launch array device 70 are OM2, OM3 and/or OM4 multimode optical fibers when the multimode optical fibers 52 of the multi-fiber array DUT 50 are any of OM2, OM3 and/or OM4 multimode optical fibers. For instance, the launch array device can have OM3 multimode optical fibers and be usable with OM2 multimode optical fibers of the multi-fiber array DUT.

As shown in FIG. 3A, the input multimode optical fiber 92a and the output multimode optical fibers 92b of the larger-parameter optical switch 90 are characterized by two second guidance parameters, i.e. a second fiber core diameter D2 and a second numerical aperture NA2. The optical switch 90 is said to be "larger-parameter" since, in this example, the second fiber core diameter D2 is substantially greater than the first fiber core diameter D1 of the multimode optical fibers 52 of the multi-fiber array DUT 50 (D2>D1) and the second numerical aperture NA2 is substantially greater than the first numerical aperture NA1 of the multimode optical fibers 52 of the multi-fiber array DUT 50 (NA2>NA1). A fiber core diameter difference $\Delta D$ can thus be defined by subtracting the first fiber core diameter D1 from the second fiber core diameter D2, i.e., $\Delta D = D2 - D1 > 0$. The fiber core diameter difference $\Delta D$ can vary from one embodiment to another. Similarly, a numerical aperture ANA can be defined by subtracting the first numerical aperture NA1 from the second numerical aperture NA2, i.e., $\Delta NA = NA2 - NA1 > 0$. The numerical aperture difference $\Delta NA$ can vary from one embodiment to another.

It will be understood that in some other examples, the larger-parameter optical switch 90 can have only one guidance parameter (e.g., a fiber core diameter or a numerical aperture) greater than a corresponding guidance parameter of the multimode optical fibers 52 of the multi-fiber array DUT 50.

In a typical case where the first fiber core diameter D1 has a nominal value of 50 µm and the first numerical aperture has a nominal value of 0.20 (e.g., when multi-fiber array DUT 50 includes OM2, OM3 and/or OM4 multimode optical fibers), the input multimode optical fiber 92*a* and the output multimode optical fibers 92*b* may be OM1 multimode optical fibers characterized by a nominal value of a second fiber core diameter D2 of 62.5 µm and a nominal value of a second numerical aperture NA2 of 0.27. In this example, a fiber core diameter difference ΔD of 12.5 µm was found convenient, although any multimode optical fibers having a second fiber core diameter D2 greater than the first fiber core diameter D1 can be used. Similarly, in this example, a numerical aperture difference ΔNA of 0.7 was found convenient, although any multimode optical fibers having a second numerical aperture NA2 greater than the first numerical aperture NA1 can be used.

It is envisaged that at least one input multimode optical fiber 92*a* and the output multimode optical fibers 92*b* of the larger-parameter optical switch 90 have one or both of the two second guidance parameters D2, NA2 larger than the corresponding one of the two first guidance parameters D1, NA1. For instance, in an embodiment, the input multimode optical fiber 92*a* is an OM1 multimode fiber (or any fiber having at least one guidance parameter larger than its corresponding first guidance parameter) while the output multimode optical fibers 92*b* and the multimode optical fibers 52 of the multi-fiber array DUT 50 are OM2, OM3 or OM4 multimode optical fibers. In another embodiment, the output multimode optical fibers 92*b* are OM1 multimode optical fibers while the input multimode optical fiber 92*a* and the multimode optical fibers 52 of the multi-fiber array DUT 50 are OM2, OM3 or OM4 multimode optical fibers. In other words, test light is propagated along at least a portion of a multimode optical fiber having any or both of the two second guidance parameters, notwithstanding if it is prior, after or into the optical switching mechanism 96 of the larger-parameter optical switch 90.

As exemplified in FIG. 3, the multimode launch system 300 is removably connected to a second multimode connector 24*a* of the OTDR 20 using the first multimode connector 94*a* of the larger-parameter optical switch 90. In another embodiment, the multimode launch system 300 is mounted inside the OTDR 20 such that the input multimode optical fiber 92*a* of the larger-parameter optical switch 90 is connected directly (e.g., via an optical splice or any other suitable optical connection) to the internal coupler 22 of the OTDR 20 and that the third multi-fiber array connector 94*b* of the larger-parameter optical switch 90 is connectable to the multi-fiber array DUT 50.

Figure 4:
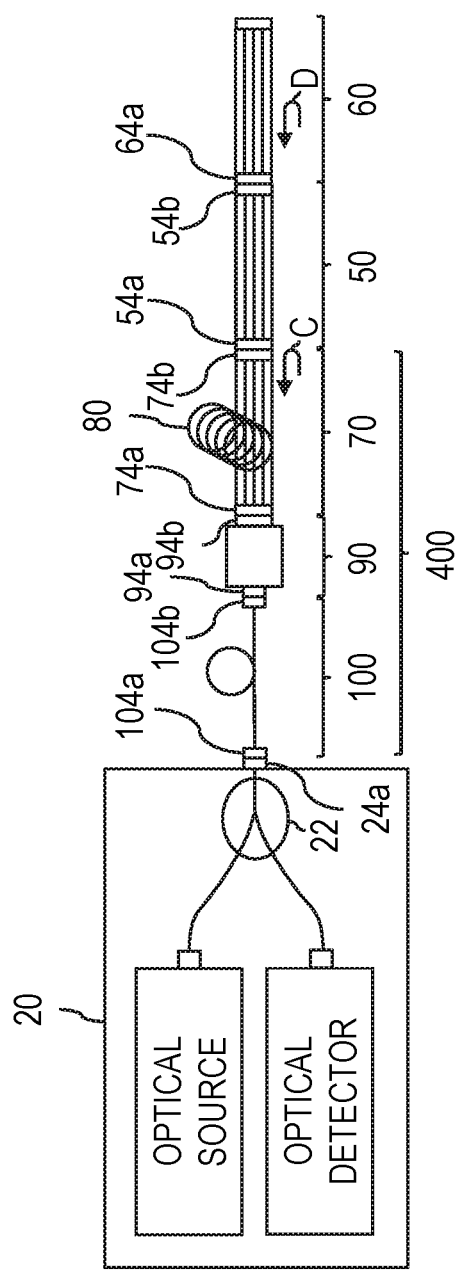
FIG. 4 is a schematic view of another example of a system for performing an OTDR measurement on a multi-fiber array DUT using a larger-parameter optical switch and a mode filter, in accordance with an embodiment.

FIG. 4 shows another example of a multimode launch system 400 for performing one or more OTDR measurements on the multi-fiber array DUT 50. The multimode launch system 400 is shown during use as it is connected between the OTDR 20 and the multi-fiber array DUT 50 followed by the receive array device 60.

The multimode launch system 400 is similar to the multimode launch system 300 but with addition of a mode filter 100 between the OTDR 20 and the optical switch 90 during use. More specifically, the multimode launch system 400 includes the mode filter 100, the larger-parameter optical switch 90, the launch array device 70 including a plurality of launch multimode optical fibers and the multi-fiber mode conditioner 80 provided therealong.

Like elements bear like reference numerals. Embodiments presented with reference to the multimode launch system 300 can also be applicable to the multimode launch system 400. For instance, the multi-fiber array DUT 50 has first and second multi-fiber array connectors 54*a* and 54*b* and the launch array device 70 has the fourth and fifth multi-fiber array connectors 74*a* and 74*b*.

As mentioned above, use of the mode filter 100 along with the larger-parameter optical switch 90 helps avoid introduction of a second bias in the OTDR measurements that would be introduced using solely the larger-parameter optical switch 90. It is understood that, in some circumstances, use of the multimode launch system 300 (which addresses the first bias but causes the second, but smaller, bias) can be satisfactory. The mode filter 100 is thus optional.

As depicted, the mode filter 100 has two opposite ends terminated by third and fourth multimode connectors 104*a* and 104*b*. The third multimode connector 104*a* is connectable to the second multimode connector 24*a* of the OTDR 20 and the fourth multimode connector 104*b* is connectable to the first multimode connector 94*a* of the larger-parameter optical switch 90 during use. In another embodiment, the mode filter 100 and the larger-parameter optical switch are connected to one another via an optical splice or any other suitable optical connection.

In one embodiment, the mode filter 100 can be provided in the form of a portion of a multimode optical fiber (e.g. an OM1, OM2, OM3 or OM4 multimode optical fiber) wrapped around a circular mandrel of a given diameter, as schematized in FIG. 4. In another embodiment, the portion of the multimode optical fiber of the mode filter 100 has guidance parameters D1, NA1 substantially equal to the first guidance parameters D1, NA1 (e.g., an OM2, OM3 or OM4 multimode optical fiber). The mode filter 100 can be provided in any other suitable form.

As it can be seen in FIG. 4, the multimode launch system 400 is removably connected to the second multimode connector 24*a* of the OTDR 20 using the third multimode connector 104*a* of the mode filter 100. In another embodiment, the multimode launch system 400 is mounted inside the OTDR 20 such that the mode filter 100 is connected to the internal coupler 22 of the OTDR 20 and that the third multi-fiber array connector 94*b* of the larger-parameter optical switch 90 is connectable to the multi-fiber array DUT 50.

Figure 5:
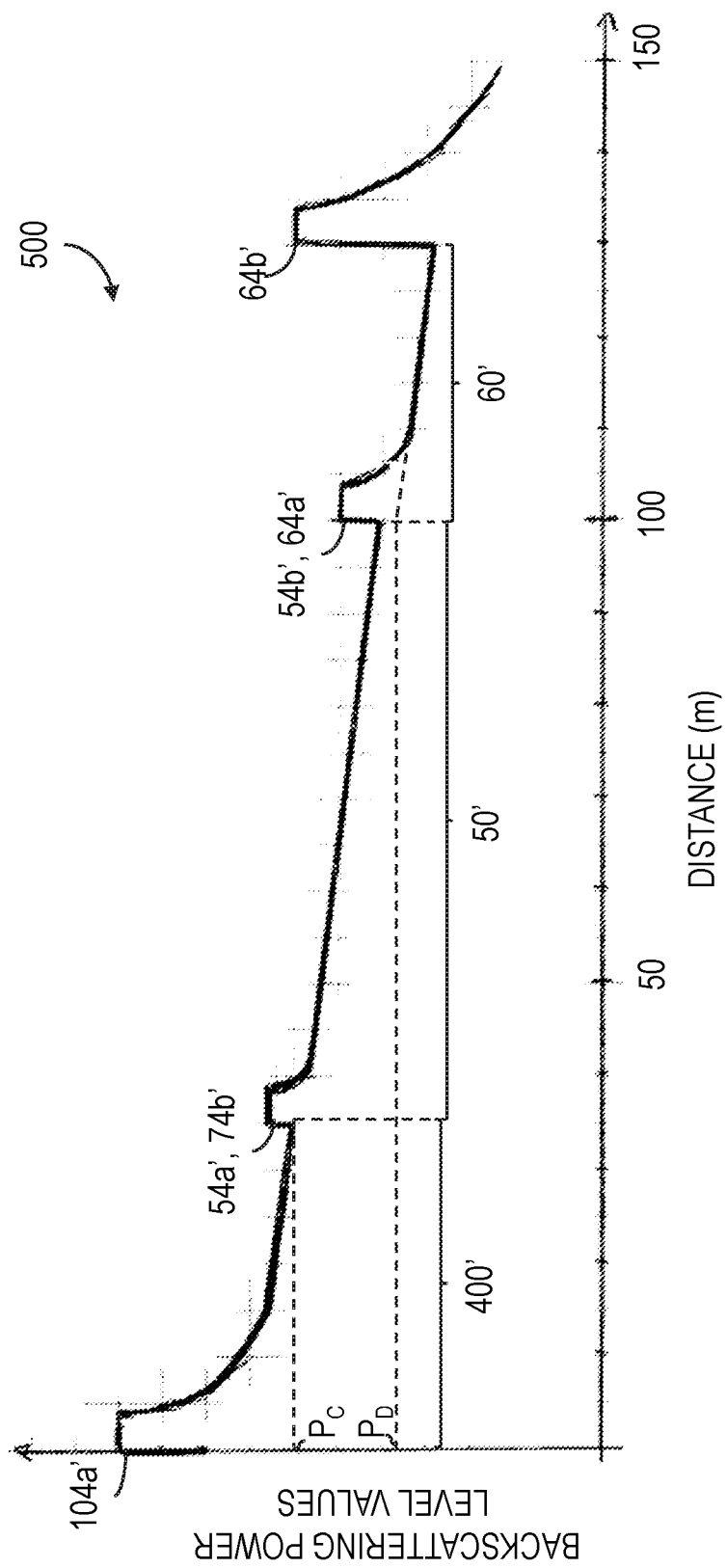
FIG. 5 is a graph of an example of an experimental OTDR measurement trace using the system of FIG. 4.

FIG. 5 is a graph of a schematic OTDR measurement trace 500 representative of an OTDR measurement trace as would be obtained when performing an OTDR measurement on the multi-fiber array DUT 50 using the multimode launch system of FIG. 4. As will be noticed, each primed reference numerals shown in the OTDR measurement trace 500 illustrates a backscattering power level associated with a respective one of the unprimed reference numerals shown in FIG. 4.

For instance, the backscattering power level associated with the multimode launch system 400 is shown in FIG. 5 at primed reference numeral 400'; the scattering power level associated with the DUT 50 is shown at primed reference numeral, the backscattering power level associated with the receive array device 60 is shown at primed reference numeral 60' and so forth.

The OTDR measurement trace 500 shows that each interface between connectors results in a reflected power level. More specifically, the OTDR measurement trace 500 shows a first reflection at 104*a*' due to the reflection of the test light at the interface of the third multimode connector 104*a* of the mode filter 100. It also shows a second reflection at 54*a*',74*b*' due to the reflection of the test light at the interface of the first multi-fiber array connector 54*a* of the multi-fiber array DUT 50 and the fifth multi-fiber array connector 74*b* of the launch array device 70. It also shows a third reflection at 54*b*', 64*a*' due to the reflection of the test light at the interface of the second multi-fiber array connector 54*b* of the multi-fiber array DUT 50 and a sixth multi-fiber array connector 64a of the receive array device 60. It is noted that the dead zone following the first reflection at 104a' hides any loss and/or reflection that are due to the interface between the mode filter 100 and the larger-parameter optical switch 90 and the interface between the larger-parameter optical switch 90 and the launch array device 70.

The test light backscattered by the launch array device 70 (referred to above as "first backscattered test light portion") is represented by arrow C in FIG. 4 and the test light backscattered by the receive array device 60 (referred to above as "second backscattered test light portion") is represented by arrow D in FIG. 4. As discussed above, with reference to FIG. 5, obtaining an exemplary optical power attenuation value OPLV using the OTDR measurement trace 500 on the multi-fiber array DUT 50 can be based on a difference ΔP between the first backscattering power level value $P_C$ associated with a far end of the launch array device 70 and a second backscattering power level value $P_D$ associated with a near end of receive array device 60, i.e. OPLV≈ΔP=$P_C$−$P_D$. It should be noted that, in practice, the second backscattering power level value $P_D$ may be obtained by linearly extrapolating the second backscattered light portion to the sixth multi-fiber array connector 64a. Conventional referencing methods may be applicable.

Referring back to FIG. 3, a method for performing a measurement using the OTDR 20 on the multi-fiber array DUT 50 is described. For instance, the method has a step of, using the larger-parameter optical switch 90, propagating test light received from the OTDR 20 (or more specifically by an optical source 26 thereof) and transmitting the received test light along one of the multimode launch optical fibers 72 of the launch array device 70 each being connected to a respective one of the multimode optical fibers 52 of the multi-fiber array DUT 50. The method has a step of, using the multi-fiber mode conditioner 80 of the launch array device 70, inducing a preferential attenuation of high-order optical fiber modes of the test light being propagated along the launch array device 70 and on a portion of the test light being backscattered along the launch array device 70. The method has a step of, using the larger-parameter optical switch 90, scrambling the optical fiber modes of the backscattered portion of test light prior to detection by an optical power detector 28 of the OTDR 20. Referring now to the embodiment of FIG. 4, the method can also have a step of, using the mode filter 100, filtering the scrambled optical fiber modes of the backscattered portion of the test light prior to detection by the OTDR 20.

Figure 6:
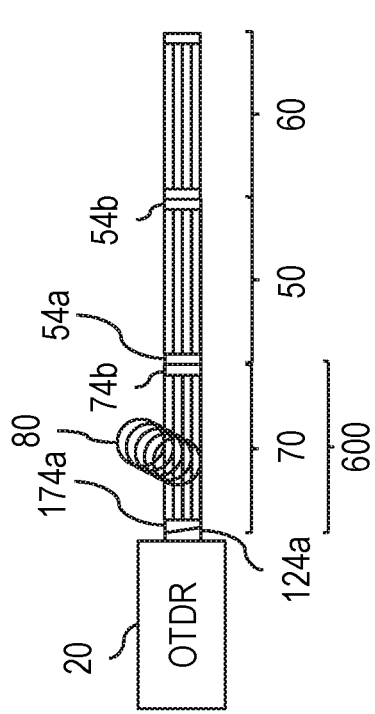
FIG. 6 is an example of a system for performing an OTDR measurement on a multi-fiber array DUT using a launch array device having multimode multi-fiber APC connectors, in accordance with an embodiment.

As mentioned above, there is provided a multimode launch system which helps increase the life span of test components used in performing an OTDR measurement on the multi-fiber multimode DUT 50. For instance, FIG. 6 is an example of a multimode launch system 600 that can be used to address the need in increasing the life of the test components.

Like element bear like reference numerals. Embodiments presented with reference to the multimode launch systems 300 and 400 can also be applicable to the multimode launch system 600. For instance, the multi-fiber array DUT 50 has first and second multi-fiber array connector 54a and 54b.

As depicted, the multimode launch system 600 has an end terminated by a first multimode multi-fiber angle-polished array connector 174a (referred to as "first multi-fiber APC array connector 174a") connected to a second multi-fiber APC array connector 124a of the OTDR 20 during use. Also, the fifth multi-fiber array connector 74b is connectable to the first multi-fiber array connector 54a of the multi-fiber array DUT 50 during use.

Use of the first and second multi-fiber APC array connectors 174a and 124a allows for reducing ORL that can alter the OTDR measurements due to the angle-polished (e.g., 8°) endfaces associated with these multimode APC array connectors. The multimode launch system 600 thus allows the launch array device 70 to be used for a longer period of time before replacement of the multimode launch system 600.

In another embodiment, one or more of the other connectors shown in FIG. 6 are provided in the form of a multimode APC array connectors, depending on the application (depending on what type of multi-fiber array DUT is to be measured). For instance, both ends of the launch array device 70 and of the multi-fiber array DUT 50 can be provided with multimode APC array connectors.

Figure 7:
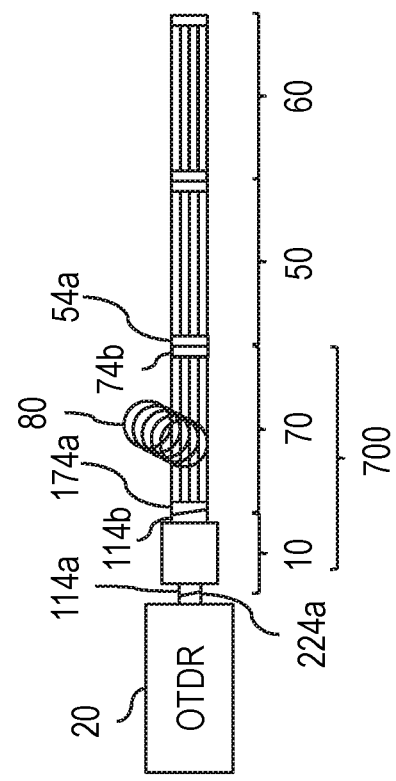
FIG. 7 is an example of a system for performing an OTDR measurement on a multi-fiber array DUT using a multimode launch system having an optical switch and a launch array device having multimode APC connectors, in accordance with an embodiment.

FIG. 7 is another example of a multimode launch system 700 that can be used to address the need in increasing the life of the test components.

Like element bear like reference numerals. Embodiments presented with reference to the multimode launch systems 300, 400 and 600 can also be applicable to the multimode launch system 700. For instance, the multimode launch system 700 has the conventional optical switch 10 and the launch array device 70 connected to one another. The multimode launch system 700 is connected between the OTDR 20 and the multi-fiber array DUT 50 followed by the receive array device 60. The launch array device 70 includes a plurality of launch multimode optical fibers and the multi-fiber mode conditioner 80 therealong.

As shown in this example, the conventional optical switch 10 has an end being terminated by a first multimode angle-polished connector 114a (referred to as "multimode APC connector 114a") connected to a second multimode APC connector 224a of the OTDR 20. The other end of the conventional optical switch 10 is terminated by a third multi-fiber APC array connector 114b connectable to the first multi-fiber APC array connector 174a of the launch array device 70 during use. In this example, the multimode array DUT 50 has an end terminated by the first multi-fiber array connector 54a (which is dictated by the DUT under test, but which is typically a flat-polished connector in most known practical applications). Therefore, the other end of the launch array device 70 has the fifth multi-fiber array connector 74b selected for connection with the first multi-fiber array connector 54a of the multimode array DUT 50 during use.

Figure 8:
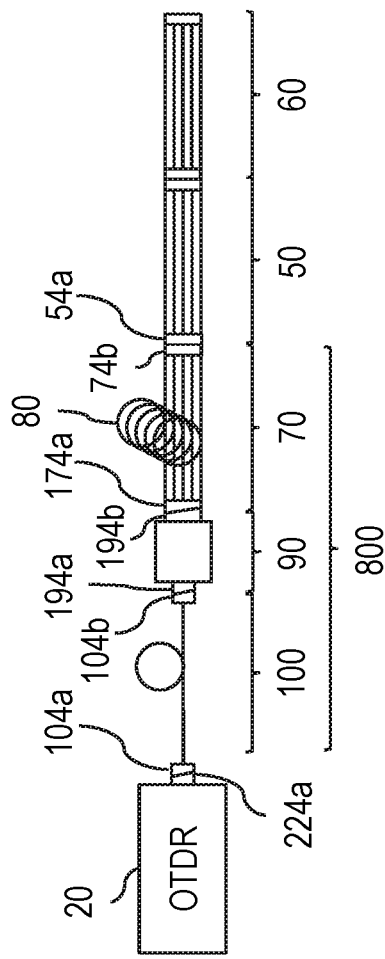
FIG. 8 is an example of a system for performing an OTDR measurement on a multi-fiber array DUT using a multimode launch system having a mode filter, an optical switch and a launch array device having multimode APC connectors, in accordance with an embodiment.

A larger-parameter optical switch can be used in the embodiment of FIG. 7. For instance, FIG. 8 is another example of a multimode launch system 800 that can be used to address the need in increasing the life of the test components but using a larger-parameter optical switch 90 as defined with reference to FIGS. 3, 3A, and 4.

Like element bear like reference numerals. Embodiments presented with reference to the multimode launch systems 300, 400, 600 and 700 can also be applicable to the multimode launch system 800. For instance, the multimode launch system 800 has the mode filter 100, the larger-parameter optical switch 90 and the launch array device 70 serially connected to one another. The multimode launch system 800 is connected between the OTDR 20 and the multi-fiber array DUT 50 followed by the receive array device 60. The launch array device 70 includes a plurality of launch multimode optical fibers and the multi-fiber mode conditioner 80 therealong. The launch array device 70 has the first multi-fiber APC array connector 174a and a fifth multi-fiber array connector 74*b* selected for connection with the first multi-fiber array connector 54*a* of the multi-fiber array DUT 50.

As depicted, the mode filter 100 has a third multimode APC connector 104*a* connectable to the second multimode APC connector 224*a* of the OTDR 20 during use. The other end of the mode filter 100 is terminated by a fourth multimode APC connector 104*b* connectable to a fifth multimode APC connector 194*a* of the larger-parameter optical switch 90 during use. The other end of the larger-parameter optical switch 90 is terminated by a fourth multi-fiber APC array connector 194*b* connected to the first multi-fiber APC array connector 174*a* of the launch array device 70.

It was found that when multi-fiber array DUTs are repeatedly connected and disconnected from the multimode launch system 800, the fifth multi-fiber array connector 74*b* may wear faster than the other connectors. Replacing the launch array device 70 can be problematic in some circumstances, especially when the multimode launch system 800 is provided inside the OTDR 20 or when the launch array device (or the multi-fiber array mode conditioner) is spliced to the larger-parameter optical switch 90. In this latter embodiment, replacing the launch array device 70 may also require replacement of the larger-parameter optical switch 90. Even if the launch array device 70 is easily accessible and replaceable, its replacement as a whole may incur undesirable expenses.

Figure 9:
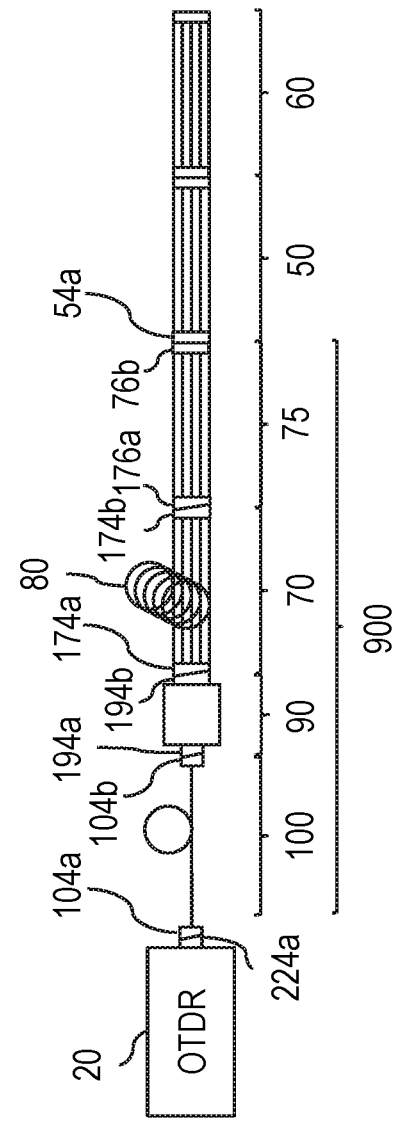
FIG. 9 is an example of a system for performing an OTDR measurement on a multi-fiber array DUT using a multimode launch system having a replaceable array patch cord.

FIG. 9 is another example of a multimode launch system 900 that can be used to address this problem.

Like element bear like reference numerals. Embodiments presented with reference to the multimode launch systems 300, 400, 600, 700 and 800 can also be applicable to the multimode launch system 900.

In this embodiment, a replaceable array patch cord 75 is provided between the launch array device 70 and the multimode-array DUT 50. The replaceable array patch cord 75 has an end terminated by a sixth multi-fiber APC array connector 176*a* and another end terminated by a seventh multi-fiber array connector 76*b*. During use, the sixth multi-fiber APC array connector 176*a* of the replaceable array patch cord 75 is connected to a fifth multi-fiber APC array connector 174*b* of the launch array device 70, and the seventh multi-fiber array connector 76*b* is connected to the first multi-fiber array connector 54*a* of the multi-fiber array DUT 50. This embodiment allows the simple and cost effective replacement of the replaceable array patch cord 75 when necessary.

In another embodiment, the plurality of multimode launch optical fibers 72 of the launch device 70 are provided as a multi-fiber array launch cable and an additional connector is inserted in the launch device 70 between the multi-fiber mode conditioner 80 and the multi-fiber array launch cable. This embodiment allows simple and cost effective replacement of the multi-fiber array launch cable when necessary.

As can be understood, the examples described above and illustrated are intended to be exemplary only. For instance, a portion of the multimode launch device is meant to be permanent while another portion of the multimode launch device is meant to be disposable when wear is above a given threshold. For instance, the mode filter, the optical switch can be considered to be in the permanent portion of the multimode launch device and the launch array device and the optional replaceable array patch cord can be considered to be in the disposable portion of the multimode array device. Optical connections that are not specifically specified as being "angle-polished" can be construed to be "angle-polished" or "flat-polished". The scope is indicated by the appended claims.

It should be understood that even though reference is made herein to the Encircled Flux requirements as defined by the IEC 61280-4-1 Standard, the embodiments described herein may be used equally to adjust the modal distribution in accordance with other definitions and other requirements. For instance, the modal distribution could equally be characterized in terms of 85/85 or 90/90 launch conditions (see AECMA Standard EN 2591-100 for example) or in terms of the Mode-Power Distribution (MPD) template and Coupled Power Ratio (CPR) (as defined in ISO/IEC 14763-3 for example).

What is claimed is:

1. A multimode launch system to be connected to an Optical Time-Domain Reflectometer (OTDR) for use in performing at least one OTDR measurement on a multi-fiber array Device Under Test (DUT), the multimode launch system comprising:

an optical switch having an input multimode optical fiber and a plurality of output multimode optical fibers, the optical switch being configured to receive test light from the OTDR into the input multimode optical fiber and to selectively transmit the received test light into one of the plurality of output multimode optical fibers during use;

a launch array device having an end being connectable to the plurality of output multimode optical fibers of the optical switch and another end being connectable to the multi-fiber array DUT during use, the launch array device having a plurality of multimode launch optical fibers each having at least one first guidance parameter being smaller than a corresponding one of at least one second guidance parameter of at least one of the input multimode optical fiber and the plurality of output multimode optical fibers of the optical switch, the optical switch and the launch array device being removably connectable to the OTDR; and a multi-fiber mode conditioner along the launch array device for inducing a preferential attenuation of higher-order optical modes of test light propagated into the multi-fiber array DUT during use.

2. The multimode launch system of claim 1 wherein the at least one first guidance parameter includes a first fiber core diameter and the corresponding one of the at least one second guidance parameter is a second fiber core diameter.

3. The multimode launch system of claim 2 wherein the first fiber core diameter is 50 μm and the second fiber core diameter is 62.5 μm.

4. The multimode launch system of claim 1 wherein the at least one first guidance parameter includes a first numerical aperture and the corresponding one of the at least one second guidance parameter is a second numerical aperture.

5. The multimode launch system of claim 4 wherein the first numerical aperture is 0.2 and the second numerical aperture is 0.27.

6. The multimode launch system of claim 1 further comprising a mode filter connectable between the input multimode optical fiber of the optical switch and the OTDR during use, the mode filter inducing a preferential attenuation of higher-order optical modes.

7. The multimode launch system of claim 6 wherein the mode filter has a portion of optical fiber having a guidance parameter being substantially equal to the first guidance parameter.

8. The multimode launch system of claim 6 wherein the mode filter has a portion of a multimode optical fiber wrapped around a mandrel of a given diameter.

9. The multimode launch system of claim 6 wherein the mode filter, the optical switch and the launch array device are removably connectable to the OTDR.

10. The multimode launch system of claim 6 wherein the mode filter, the optical switch and the launch array device are mounted inside the OTDR.

11. The multimode launch system of claim 1 wherein the multi-fiber mode conditioner includes wrapping a portion of each of the plurality of multimode launch optical fibers around a mandrel of a given diameter.

12. The multimode launch system of claim 1 wherein the plurality of output multimode optical fibers of the optical switch and the launch array device are connected via multi-fiber array connectors.

13. The multimode launch system of claim 12 wherein the multi-fiber array connectors are multimode multi-fiber angle-polished array connectors.

14. The multimode launch system of claim 1 wherein the launch array device has at least one end being terminated by a multimode multi-fiber angle-polished array connector.

15. The multimode launch system of claim 1 wherein the optical switch has an end being terminated by an angle-polished connector and connectable towards the OTDR.

16. The multimode launch system of claim 6 wherein the launch array device has at least one end being terminated by a multimode multi-fiber angle-polished array connector and wherein the mode filter is terminated by two angle-polished connectors, one of the angle-polished connectors of the mode filter being connectable to the OTDR and the other one of the angle-polished connectors of the mode filter being connectable to the optical switch.

17. An OTDR enclosing the multimode launch system of claim 1, wherein the multi-fiber array DUT is connectable to the optical switch via a multi-fiber array connector of the OTDR.

18. A multimode launch system to be connected to an Optical Time-Domain Reflectometer (OTDR) for use in performing at least one OTDR measurement on a multi-fiber array Device Under Test (DUT), the multimode launch system comprising:

an optical switch having an input multimode optical fiber and a plurality of output multimode optical fibers, the optical switch being configured to receive test light from the OTDR into the input multimode optical fiber and to selectively transmit the received test light into one of the plurality of output multimode optical fibers during use;

a launch array device having an end being connectable to the plurality of output multimode optical fibers of the optical switch and another end being connectable to the multi-fiber array DUT during use, the launch array device having a plurality of multimode launch optical fibers each having at least one first guidance parameter being smaller than a corresponding one of at least one second guidance parameter of at least one of the input multimode optical fiber and the plurality of output multimode optical fibers of the optical switch;

a multi-fiber mode conditioner along the launch array device for inducing a preferential attenuation of higher-order optical modes of test light propagated into the multi-fiber array DUT during use; and a mode filter connectable between the input multimode optical fiber of the optical switch and the OTDR during use, the mode filter inducing a preferential attenuation of higher-order optical modes, the mode filter having a portion of optical fiber having a guidance parameter being substantially equal to the first guidance parameter.

19. An Optical Time-Domain Reflectometer (OTDR) for use in performing at least one OTDR measurement on a multi-fiber array Device Under Test (DUT), the OTDR enclosing a multimode launch system comprising:

an optical switch having an input multimode optical fiber and a plurality of output multimode optical fibers, the optical switch being configured to receive test light from the OTDR into the input multimode optical fiber and to selectively transmit the received test light into one of the plurality of output multimode optical fibers during use;

a launch array device having an end being connectable to the plurality of output multimode optical fibers of the optical switch and another end being connectable to the multi-fiber array DUT during use, the launch array device having a plurality of multimode launch optical fibers each having at least one first guidance parameter being smaller than a corresponding one of at least one second guidance parameter of at least one of the input multimode optical fiber and the plurality of output multimode optical fibers of the optical switch; and a multi-fiber mode conditioner along the launch array device for inducing a preferential attenuation of higher-order optical modes of test light propagated into the multi-fiber array DUT during use, the multi-fiber array DUT being connectable to the optical switch via a multi-fiber array connector of the OTDR.

* * * * *